United States Patent [19]

Fukushima et al.

[11] Patent Number: 5,262,833
[45] Date of Patent: Nov. 16, 1993

[54] IMAGE FORMING APPARATUS AND METHOD

[75] Inventors: Hisashi Fukushima, Kawasaki; Haruhiko Moriguchi, Yokohama; Nobuatsu Sasanuma, Yamato, all of Japan

[73] Assignee: Canon Kabushiki Kaisha, Tokyo, Japan

[21] Appl. No.: 885,774

[22] Filed: May 20, 1992

[30] Foreign Application Priority Data

May 23, 1991 [JP] Japan ................................. 3-118739
Sep. 2, 1991 [JP] Japan ................................. 3-221704

[51] Int. Cl.$^5$ .................................................. G03G 15/01
[52] U.S. Cl. ..................................... 355/327; 355/208; 395/900
[58] Field of Search ............... 355/208, 204, 326, 327; 395/900, 903, 904

[56] References Cited

U.S. PATENT DOCUMENTS 4,888,636 12/1989 Abe ........................................ 358/80
5,029,314 7/1991 Katsumi et al. ...................... 355/208
5,142,332 8/1992 Osawa et al. ........................ 355/208

FOREIGN PATENT DOCUMENTS 63-208368 8/1988 Japan .
63-208369 8/1988 Japan .
3-10265 1/1991 Japan .
3-10269 1/1991 Japan .

Primary Examiner—R. L. Moses
Attorney, Agent, or Firm—Fitzpatrick, Cella, Harper & Scinto

[57] ABSTRACT

According to the present invention, an image forming apparatus comprises an image forming unit for producing an image on paper, a detector for detecting a plurality of parameters indicating a state of the image forming unit, a corrector for correcting the state of the image forming unit, a rule memory for storing rules for determining the relation between the parameters and the timing of operation of the corrector, and a control for controlling the corrector according to the parameters the detector detects and the rules stored in the memory. Therefore, even a simple configuration permits high-precision control. This reduces a time loss due to the correcting operation, minimizes consumption of development agent, and thus ensures constant gradation all the time.

14 Claims, 19 Drawing Sheets

FIG. 7

| No. | Y | M | C | BK | No. | Y | M | C | BK | No. | Y | M | C | BK | No. | Y | M | C | BK |
|---|---|---|---|---|---|---|---|---|---|---|---|---|---|---|---|---|---|---|---|
| 0  | 0 | 0 | 0 | 0 | 16 | 0 | 0 | 1 | 0 | 32 | 0 | 0 | 2 | 0 | 48 | 0 | 0 | 3 | 0 |
| 1  | 1 | 0 | 0 | 0 | 17 | 1 | 0 | 1 | 0 | 33 | 1 | 0 | 2 | 0 | 49 | 1 | 0 | 3 | 0 |
| 2  | 2 | 0 | 0 | 0 | 18 | 2 | 0 | 1 | 0 | 34 | 2 | 0 | 2 | 0 | 50 | 2 | 0 | 3 | 0 |
| 3  | 3 | 0 | 0 | 0 | 19 | 3 | 0 | 1 | 0 | 35 | 3 | 0 | 2 | 0 | 51 | 3 | 0 | 3 | 0 |
| 4  | 0 | 1 | 0 | 0 | 20 | 0 | 1 | 1 | 0 | 36 | 0 | 1 | 2 | 0 | 52 | 0 | 1 | 3 | 0 |
| 5  | 1 | 1 | 0 | 0 | 21 | 1 | 1 | 1 | 0 | 37 | 1 | 1 | 2 | 0 | 53 | 1 | 1 | 3 | 0 |
| 6  | 2 | 1 | 0 | 0 | 22 | 2 | 1 | 1 | 0 | 38 | 2 | 1 | 2 | 0 | 54 | 2 | 1 | 3 | 0 |
| 7  | 3 | 1 | 0 | 0 | 23 | 3 | 1 | 1 | 0 | 39 | 3 | 1 | 2 | 0 | 55 | 3 | 1 | 3 | 0 |
| 8  | 0 | 2 | 0 | 0 | 24 | 0 | 2 | 1 | 0 | 40 | 0 | 2 | 2 | 0 | 56 | 0 | 2 | 3 | 0 |
| 9  | 1 | 2 | 0 | 0 | 25 | 1 | 2 | 1 | 0 | 41 | 1 | 2 | 2 | 0 | 57 | 1 | 2 | 3 | 0 |
| 10 | 2 | 2 | 0 | 0 | 26 | 2 | 2 | 1 | 0 | 42 | 2 | 2 | 2 | 0 | 58 | 2 | 2 | 3 | 2 |
| 11 | 3 | 2 | 0 | 0 | 27 | 3 | 2 | 1 | 0 | 43 | 3 | 2 | 2 | 0 | 59 | 3 | 2 | 3 | 2 |
| 12 | 0 | 3 | 0 | 0 | 28 | 0 | 3 | 1 | 0 | 44 | 0 | 3 | 2 | 0 | 60 | 0 | 3 | 3 | 0 |
| 13 | 1 | 3 | 0 | 0 | 29 | 1 | 3 | 1 | 0 | 45 | 1 | 3 | 2 | 0 | 61 | 1 | 3 | 3 | 0 |
| 14 | 2 | 3 | 0 | 0 | 30 | 2 | 3 | 1 | 0 | 46 | 2 | 3 | 2 | 0 | 62 | 2 | 3 | 3 | 2 |
| 15 | 3 | 3 | 0 | 0 | 31 | 3 | 3 | 1 | 0 | 47 | 3 | 3 | 2 | 0 | 63 | 3 | 3 | 3 | 3 |

PHOTO-SENSITIVE MEMBER SENSITIVITY

NUMBER OF CUMULATIVE SHEETS

COLOR CORRECTION INTERVAL

FIG.11

| COLOR CORRECTION INTERVAL / NUMBER OF CUMULATIVE RECORD SHEETS | | PHOTOSENSITIVE MEMBER SENSITIVITY | | |
|---|---|---|---|---|
| | | SL | SM | SH |
| | PL | TH | TH | TM |
| | PM | TH | TM | TL |
| | PH | TM | TL | TL |

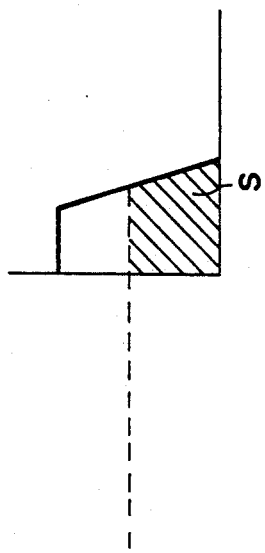
FIG.21A
FIG.21B
FIG.21C
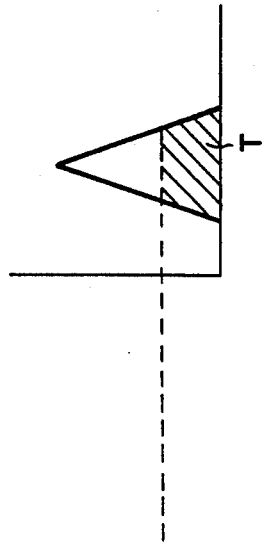
FIG.21D
FIG.21E
FIG.21F
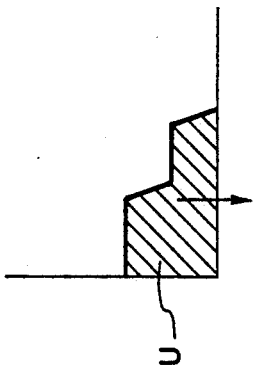
FIG.21G

FIG. 23A

|  |  | PHOTOSENSITIVE MEMBER SENSITIVITY | | |
|---|---|---|---|---|
|  |  | SL | SM | SH |
| DEVELOPMENT AGENT DENSITY | RL | TL | TM | TH |
|  | RM | TM | TH | TM |
|  | RH | TH | TM | TL |

FIG. 23B

|  |  | PHOTOSENSITIVE MEMBER SENSITIVITY | | |
|---|---|---|---|---|
|  |  | SL | SM | SH |
| DEVELOPMENT AGENT DENSITY | RL | ML | MM | MH |
|  | RM | MM | MH | MM |
|  | RH | MH | MM | ML |

IMAGE FORMING APPARATUS AND METHOD

BACKGROUND OF THE INVENTION

1. Field of the Invention

The present invention relates to an image forming apparatus; such as, a copying machine or a laser printer, or more particularly, to an image forming apparatus using image formation control inference.

2. Related Background Art

FIG. 1 shows an example of a schematic configuration of a color copying apparatus of a conventional color image forming apparatus. In FIG. 1, numeral 1 denotes an original. 2 is an original glass base on which the original is placed. 3 denotes a light. 4 represents an image forming element array. 5 is an infrared cutoff filter. 6 denotes a contact type CCD color sensor (hereafter, CCD). 7 is an optical unit.

First, a copying process will be described. When a Copy key (not shown) is pressed, a light 3 illuminates an original 1. Light reflected from the original passes through an image forming element array 4 and an infrared cutoff filter 5. Then, the original image is formed on a CCD 6. An optical unit 7 moves to scan the original in an arrow-direction. As shown in FIG. 2, the CCD 6 has red (R), green (G), and blue (B) filters set in an array for each pixel.

While scanning the original, an electric signal from the CCD 6 is processed by a signal processing circuit shown in FIG. 3. In FIG. 3, 6R, 6G, and 6B denote signals sent from R (red), G (green), and B (blue) elements on the CCD 6. Next, the R, G, and B original image signals go to a circuit 14 for logarithmic or A/D conversion, then are converted into digital signals Y', M', and C' in association with formation image colors; that is, yellow (Y), magenta (M), and cyan (C). The Y', M', and C' signals enter a color conversion circuit 15 for masking or underlying color removal (hereafter, UCR). The color conversion circuit 15 performs an operation represented as the expression below.

$$\begin{pmatrix} Y'' \\ M'' \\ C'' \\ B_K'' \end{pmatrix} = \begin{pmatrix} a_{11} & a_{12} & a_{13} & 0 \\ a_{21} & a_{22} & a_{23} & 0 \\ a_{31} & a_{32} & a_{33} & 0 \\ 0 & 0 & 0 & a_{44} \end{pmatrix} \begin{pmatrix} Y' \\ M' \\ C' \\ (Y', M', C')_{min} \end{pmatrix} + \begin{pmatrix} 0 \\ 0 \\ 0 \\ b_4 \end{pmatrix} \quad (1)$$

where, $(Y', M', C')_{min}$ is the smallest among Y', M', C' and C' signals, and $a_{11}$ to $a_{44}$ and $b_4$ are color conversion coefficients.

Thus, the color conversion circuit 15 provides Y'', M'', C'', and $B_K''$ signals. These signals enter a color laser printer 16 to drive a laser driver (not shown).

FIG. 4 shows an example of a configuration of a color laser printer 16 that has been known in the past. In FIG. 4, a laser beam converted by a laser driver (not shown) is emitted to scan photosensitive drum 11 via a scanning polygon mirror 8 and a stationary deflection mirror 9. Then, a latent image is produced on the photosensitive drum 11 that is rotating in an arrow direction. The latent image is developed using color toner with rotation of a rotary developing unit 10.

On the other hand, transfer paper 13 is wound on a transfer drum 12. The transfer drum 12 rotates once for each of colors Y, M, C, and $B_K$ in that order, thus rotating four times in total. When transfer is complete, the transfer paper 13 departs from the transfer drum 12. Then, fusing rollers 22 fuse the toner of the colors. Thus, a print 20 is created.

In the aforesaid example of prior art, fixed values are used as the color conversion coefficients (coefficients $a_{11}$ to $a_{44}$, and $b_4$ in the expression (1)) for a color conversion (masking and UCR) circuit 15. That is to say, these color conversion coefficients are predetermined to minimize color differences between an original 1 and a print 20.

However, the color processing characteristics of a printer 16 vary depending on a toner feed state, or with an environmental variation or a time-sequential change of a photosensitive member. This makes it difficult to retain uniform color reproducibility. Thus, when the color conversion coefficients for a color conversion circuit are fixed, the color differences between an original 1 and a print 20 become noticeable.

To cope with the above problems, this applicant has proposed a solution in Japanese Patent Application No. 63-208369. In the solution, the result of output of a specific gradation pattern is read out to set the color processing characteristics of an image printer. However, it is time-consuming that a specific pattern must be output, then the result must be read.

In the aforesaid image forming apparatus, a means for correcting the gamma characteristic of a printer is incorporated to divide gradation in steps of densities. However, such characteristics as the sensitivity of a photosensitive drum, development capability, and transfer efficiency vary with an environmental variation or a change over time. Preprogrammed gamma correction cannot provide satisfactory gradation in the initial stage. In U.S. Pat. No. 4,888,636 or Japanese Patent Application No. 63-208368, this applicant has proposed an image forming technology using an operation in which an image is produced according to a specific pattern on a photosensitive drum or recording medium, the output of a pattern reading means is compared with an initial gradation pattern, then the gradation correction characteristic of a gradation correcting means is determined.

However, in the foregoing example of prior art, it is time-consuming to perform gradation correction after an image is formed according to a specific pattern. Furthermore, toner is wasted. In particular, when gradation correction must be done frequently, a time loss caused by gradation correction becomes serious. Moreover, a procedure of detecting the variations of the elements or performances of a photosensitive drum, a developing unit, and a transfer drum, then feeding back the variations to a gradation correcting means requires a complex control program.

SUMMARY OF THE INVENTION

The object of the present invention is to provide an image forming apparatus capable of optimizing the condition of an image forming means.

Another object of the invention is to correct the image forming means according to appropriate timing.

To achieve these objects, the present invention provides an image forming apparatus comprising an image forming means for forming an image on a medium, a detecting means for detecting a plurality of parameters indicating a condition of the image forming means, a correction means for correcting the condition of the image forming means, a rule storage means for storing rules for determining the relation between the parameters detected by the detecting means and the timing of operation of the correction means, and a control means for controlling the operation of the correction means in accordance with the parameters detected by the detecting means and the rules stored in the rule storage means.

Another object of the present invention is to provide an image forming apparatus using a method of optimizing its condition.

To achieve these objects, the present invention provides an image forming apparatus comprising a detecting means for detecting a plurality of parameters indicating a condition of the image forming apparatus, a correction means for correcting the condition of the apparatus, a rule storage means for storing rules for determining the relation between the parameters and the timing of operation of the correction means, and a control means for controlling the operation of the correction means in accordance with the parameters detected by the detecting means and the rules stored in the rule storage means.

Other objects and advantages of the present invention will be apparent in conjunction with the drawings and the appended claims.

BRIEF DESCRIPTION OF THE DRAWINGS

FIG. 7 shows an example of a gradation pattern from a pattern generator of FIG. 6 outputs;

FIG. 8 comprising

FIG. 11 shows an example of fuzzy rules in an embodiment of the present invention;

FIGS. 21A to 21G are explanatory diagrams for fuzzy inference;

FIGS. 23A and 23B show tables defining fuzzy rules.

DESCRIPTION OF THE PREFERRED EMBODIMENTS

First embodiment

Embodiments of the present invention will be described in detail in conjunction with the drawings.

Figure 5:
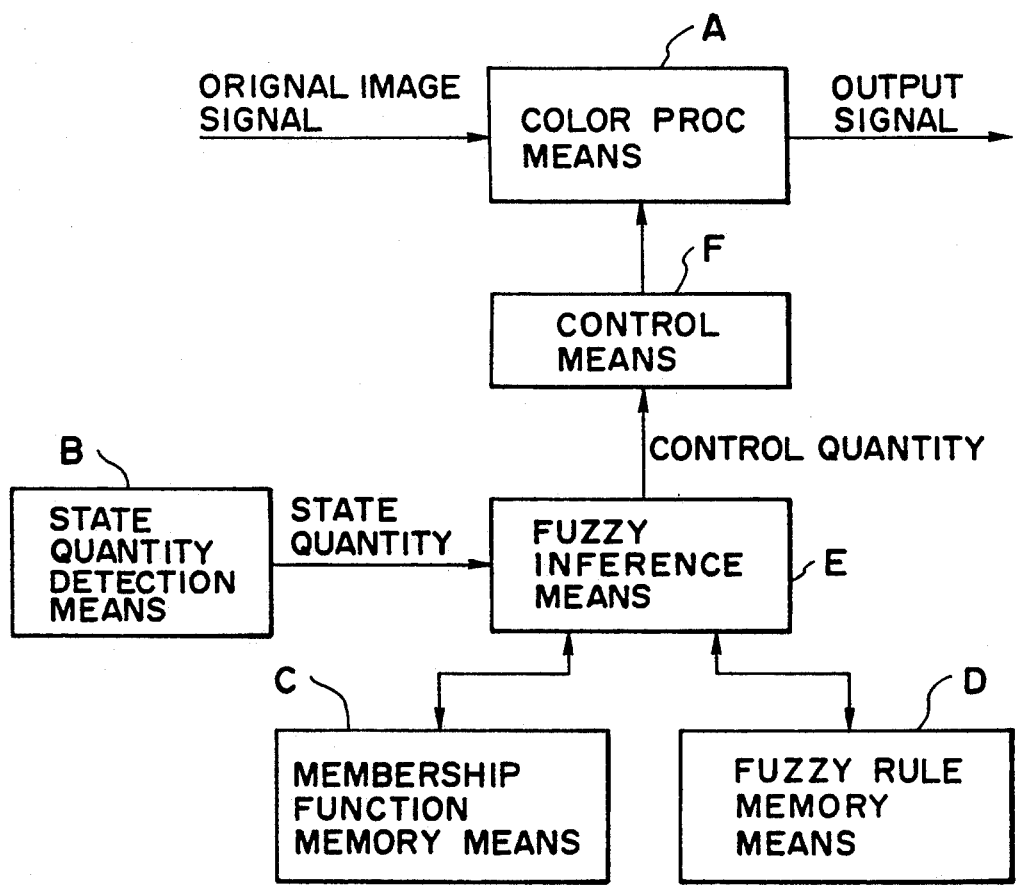
FIG. 5 is a functional block diagram showing a basic configuration of an embodiment of the present invention.

FIG. 5 is a functional block diagram showing a basic configuration of a color image forming apparatus according to an embodiment of the present invention.

In FIG. 5, A denotes a color processing means for performing color processing, which inputs R, G, and B original image signals and outputs Y, M, C, and K field-sequential signals for forming a color image. B denotes a state quantity detection means for detecting quantities of state values of an apparatus that affect the tone of a formed image color. C denotes a membership function memory means in which quantities of state values and a quantity of control of the color processing means A are expressed as fuzzy sets given by membership functions. D denotes a fuzzy rule memory means in which the relations between the fuzzy sets for quantities of state values and the fuzzy sets for a quantity of control.

E denotes a fuzzy inference means for referencing the membership function memory means C and fuzzy rule memory means D according to quantities of state values the state quantity detecting means B detects, calculating a degree of membership between a quantity of control and the set using a degree of membership between the quantities of state values and the sets, then drawing a fuzzy inference of an optimal quantity of control with highest probability according to the result of the calculation. F denotes a control means for controlling the color processing means A according to the optimum quantity of control the fuzzy inference means E infers.

Other memory means included produces a latent image by exposing a uniformly-changed photosensitive member according to an output signal of the color processing means A, develops the latent image with color development agents, then transfers the developed image onto a recording medium. The state quantity detecting means B is characteristic of detecting at least one of the exposure sensitivity of a photosensitive member, number of cumulative recorded images, density of color development agent, and transfer efficiency of a transfer drum as a quantity of state value. The control means F is characteristic of controlling at least either the processing coefficients for a color processing means A or the interval of executing color correction of color processing.

Figure 1:
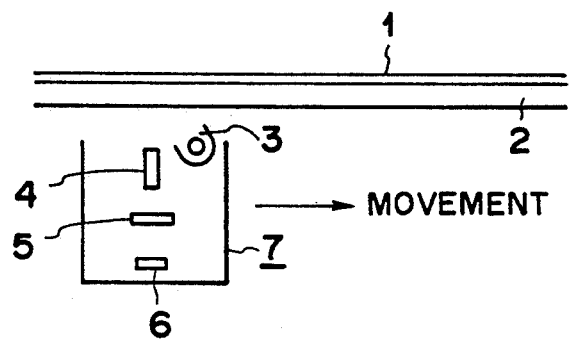
FIG. 1 is a cross-sectional drawing showing a schematic configuration of a conventional color copying apparatus.
Figure 2:
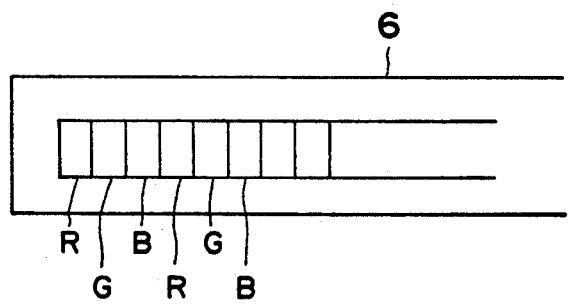
FIG. 2 is a plan view of a configuration of a CCD color sensor of the conventional apparatus of FIG. 1.
Figure 3:
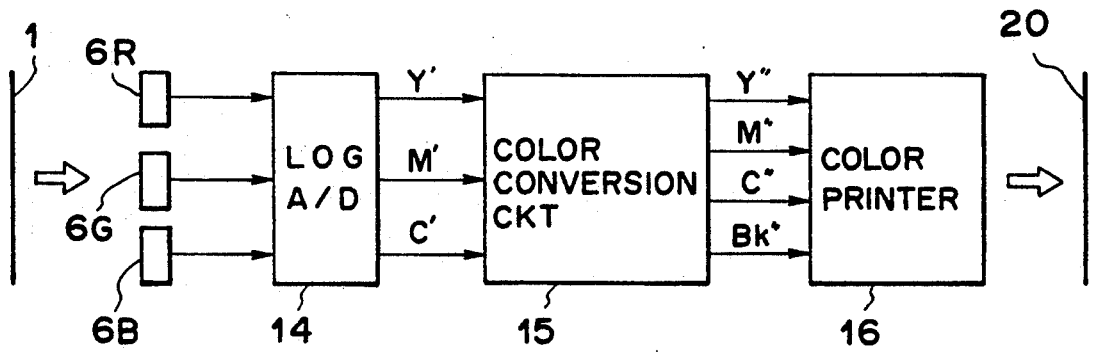
FIG. 3 is a block diagram showing a circuit configuration of the conventional apparatus of FIG. 1.
Figure 4:
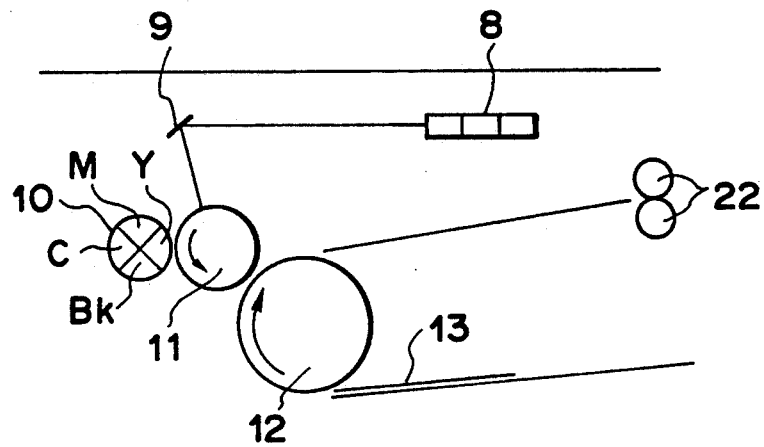
FIG. 4 is a cross-sectional diagram showing an example of a configuration of a color printer shown in FIG. 3.
Figure 6:
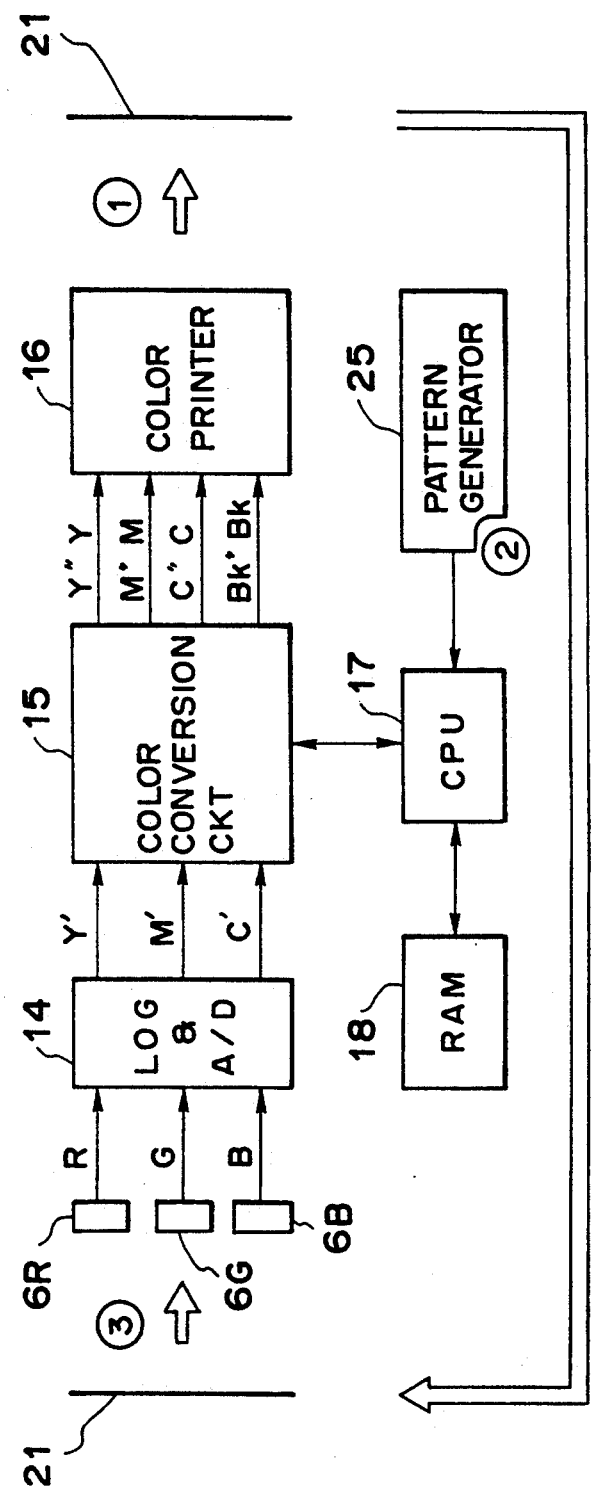
FIG. 6 is a block diagram showing a circuit configuration of an embodiment of the present invention.

FIG. 6 shows an example of a specific circuit configuration required for implementing the present invention. Components identical to those of a conventional apparatus shown in FIG. 3 are assigned the same symbols. In FIG. 6, reference number 17 denotes a central processing unit (hereafter, CPU). Reference number 18 is a random access memory (hereafter, RAM) containing the contents of FIGS. 10 to 12 to be described later. Reference number 25 denotes a pattern generator, containing a table listing mixing ratios of Y, M, C, $B_K$ colors shown in FIG. 7.

Figure 8A:
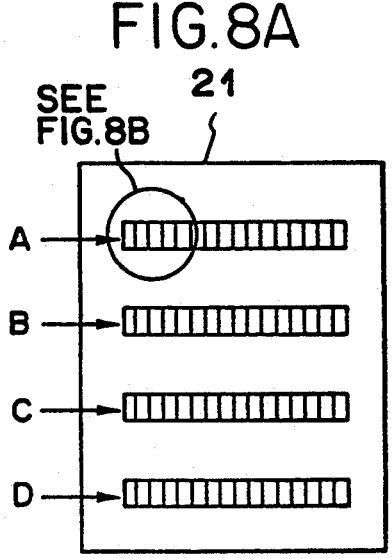
FIGS. 8A and 8B, shows an example of the pattern of FIG. 7 that is developed in transfer paper.
Figure 8B:
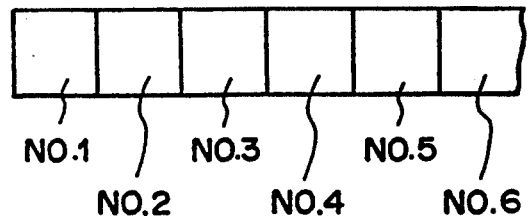

First, a feedback system indicated with ①to ③in FIG. 6 will be discussed. When a Test-mode indicator key (not shown) is pressed, a pattern generator generates a predetermined gradation pattern. Then, such a pattern as that shown in FIG. 8 is printed on paper. This gradation pattern consists of colors No. 1 to No. 63 created by mixing yellow (Y), magenta (M), cyan (C), and black ($B_K$) at gradually changing mixing ratios.

This table is preliminarily saved in memory (not shown) of the pattern generator 25. If a printer 16 supports colors of 256 gradation levels, 0 in FIG. 7 indicates a level 0, 1, a level 85, 2, a level 170, and 3, a level 255. No. 0 indicates a state that no color toner is printed.

Figure 9:
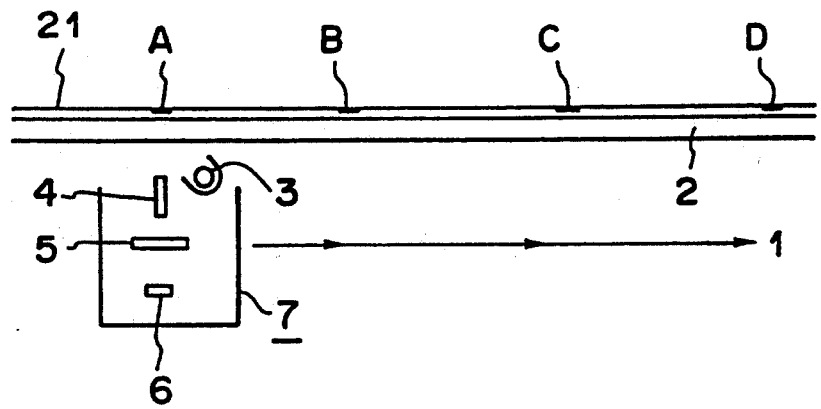
FIG. 9 is a cross-sectional diagram showing a process of reading the patterns of FIG. 8.

Next, paper 21 in which a thus-created gradation pattern including 64 colors is printed is placed at a predetermined position on an original glass base 2, as shown in FIG. 9, in the same manner as an original is placed.

Then, as shown in FIG. 9, an optical unit 7 stops at a point A of the paper 21 on which the gradation pattern is printed. Then, a light 3 illuminates an original. A CCD 6 reads the mixed color pattern. The read information is stored in a RAM 18. Next, the optical unit 7 moves to a point B. Then, the mixed color pattern is read in the same manner as that at the point A. This procedure is repeated for points C and D. Then, the mixed color patterns are stored in the RAM 18. Thus, output values $Y_i'$, $M_i'$, and $C_i'$ (i represents a mixed color pattern number) of the 64-color pattern are provided.

Moreover, a reference white plate (not shown) is placed at the tip of the original glass base. The CCD 6 reads the light reflected from the reference white plate. Based on the output values $Y_w$, $M_w$, and $C_w$ of the reference white plate, the output values $Y_i'$, $M_i'$, and $C_i'$ are corrected by performing shading compensation. The shading compensation is performed after logarithmic conversion. Therefore, an operation represented as an expression $Y = 255 - Y_w + Y_i'$ can apply to the $M_i'$ or $C_i'$ value.

Next, the values after shading compensation are used as new output values $Y_i'$, $M_i'$, $C_i'$, and $B_K$. Then, the new output values $Y_i'$, $M_i'$, $C_i'$ and $B_K$ are assigned to the aforesaid expression (1) to calculate $Y_i''$, $M_i''$, $C_i''$ and $B_K''$. After that, the $Y_i''$, $M_i''$, $C_i''$, and $B_K''$ are approximated to the predetermined values Y, M, C, and $B_K$ in FIG. 7, then the coefficients of the expression (1) are determined according to the expression below.

Assume that evaluation functions for yellow, magneta, and cyan are $\phi_Y$, $\phi_M$, and $\phi_C$ respectively. First, the coefficients for yellow are determined by the following expressions:

$$\phi_Y = \sum_i (a_{11} Y_i' + a_{12} M_i' + a_{13} C_i' - Y_i)^2 \tag{2}$$

$$\frac{\partial \phi_Y}{\partial a_{11}} 2\left\{ \left(\sum_i Y_i' Y_i'\right) a_{11} + \left(\sum_i M_i' Y_i'\right) a_{12} + \left(\sum_i C_i' Y_i'\right) a_{13} - \left(\sum_i Y_i Y_i'\right) \right\} = 0$$

$$\frac{\partial \phi_Y}{\partial a_{12}} 2\left\{ \left(\sum_i Y_i' M_i'\right) a_{11} + \left(\sum_i M_i' M_i'\right) a_{12} + \left(\sum_i C_i' M_i'\right) a_{13} - \left(\sum_i Y_i M_i'\right) \right\} = 0$$

$$\frac{\partial \phi_Y}{\partial a_{13}} 2\left\{ \left(\sum_i Y_i' C_i'\right) a_{11} + \left(\sum_i M_i' C_i'\right) a_{12} + \left(\sum_i C_i' M_i'\right) a_{13} - \left(\sum_i Y_i C_i'\right) \right\} = 0$$

After the coefficients for magneta and cyan are also determined similarly, an expression below (3) is provided.

$$\begin{pmatrix} \sum_i Y_i' Y_i' & \sum_i M_i' Y_i' & \sum_i C_i' Y_i' \\ \sum_i Y_i' M_i' & \sum_i M_i' M_i' & \sum_i C_i' M_i' \\ \sum_i Y_i' C_i' & \sum_i M_i' C_i' & \sum_i C_i' C_i' \end{pmatrix} \tag{3}$$

$$\begin{pmatrix} a_{11} & a_{21} & a_{31} \\ a_{12} & a_{22} & a_{32} \\ a_{13} & a_{23} & a_{33} \end{pmatrix} =$$

$$\begin{pmatrix} \sum_i Y_i Y_i' & \sum_i M_i Y_i' & \sum_i C_i Y_i' \\ \sum_i Y_i M_i' & \sum_i M_i M_i' & \sum_i C_i M_i' \\ \sum_i Y_i C_i' & \sum_i M_i C_i' & \sum_i C_i C_i' \end{pmatrix}$$

Herein, the above expression is symbolized as [C][A]=[D]. This brings about $A = C^{-1}D$, thus providing the coefficients $a_{11}$ to $a_{33}$. Note that $C^{-1}$ is an inverse matrix of C.

Next, $a_{44}$ and $b_4$ are determined using an evaluation function $\phi$. That is to say, $$\phi = \sum_i (a_{44}(Y_i', M_i', C_i')_{min} + b_4 - B_{Ki})^2$$

This evaluation function $\phi$ is assigned to the expressions below.

$$\frac{\partial \phi}{\partial a_{44}} 2\left\{ \sum_i (Y_i', M_i', C_i')_{min} a_{44} + \sum_i (Y_i', M_i', C_i') b_4 - \sum_i B_K(Y_i', M_i', C_i')_{min} \right\} = 0 \tag{4}$$

$$\frac{\partial \phi}{\partial b_4} 2\left\{ \left(\sum_i (Y_i', M_i', C_i')_{min} a_{44} + (\Sigma I) b_4 - \Sigma B_{Ki}\right) \right\} = 0$$

Consequently, $$\begin{pmatrix} \sum_i (Y_i', M_i', C_i')^2_{min} & \sum_i (Y_i', M_i', C_i')_{min} \\ \sum_i (Y_i', M_i', C_i')_{min} & \sum_i 1 \end{pmatrix} \begin{pmatrix} a_{44} \\ b_4 \end{pmatrix} =$$

-continued $$\left( \begin{array}{c} \sum_i (Y_i', M_i', C_i')_{min} \cdot B_K \\ \sum_i B_{Ki} \end{array} \right)$$

Herein, the above expression is symbolized as [E] [F] = [G]. This brings about $F = E^{-1} \times G$, thus providing the coefficients $a_{44}$ and $b_4$. Note that $E^{-1}$ is an inverse matrix of E.

A CPU 18 executes an operation of calculating $a_{11}$ to $a_{33}$, $a_{44}$, and $b_4$ using the aforesaid expressions.

Next, the calculated coefficients $a_{11}$ to $a_{33}$, $a_{44}$, and $b_4$ are supplied to a color conversion circuit 15.

Figure 10A:
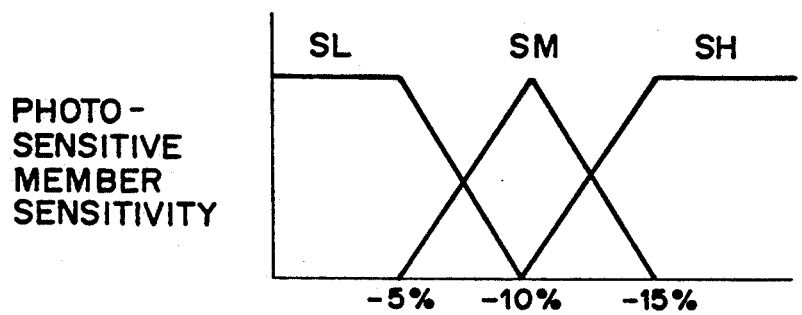
FIGS. 10A to 10C are graphs showing fuzzy sets of membership functions in an embodiment of the present invention.
Figure 10B:
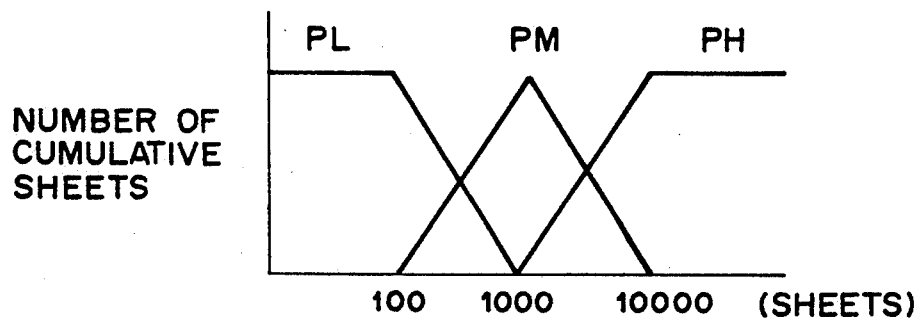
Figure 10C:
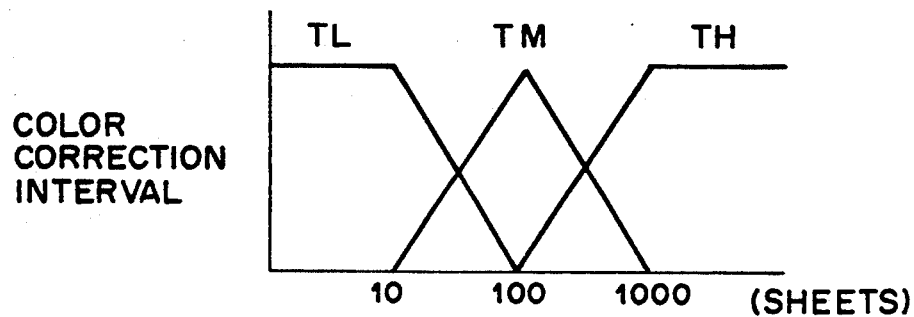

The sensitivity of a photosensitive member 11 and the number of cumulative recorded images after a service engineer has completed maintenance or the recorded image counter has been reset are measured as examples of state values during the foregoing control operation. In addition, the aforesaid color correction execution interval is used as an example of a quantity of control. FIGS. 10A to 10C show membership functions for defining fuzzy sets concerning quantities of state values and a quantity of control. Three membership functions are predetermined for each of the quantities of state values and of control as shown in FIGS. 10A to 10C. That is to say, each of the sensitivity of a sensitivity member, number of cumulative recorded images, and color correction execution interval is classified into three fuzzy sets (for example, SL, SM, and SH) defined by three membership functions.

Next, the fuzzy sets for quantities of state values or a sensitivity of a sensitivity member and a number of cumulative recorded images and the fuzzy sets for a quantity of control or a color correction execution interval are used to explain how to calculate an optimal color correction execution interval according to the sensitivity of a sensitivity member and number of cumulative recorded images. FIG. 11 shows fuzzy rules employed for this calculation. In FIG. 11, SL, SM, and SH denote fuzzy sets for the sensitivity of a sensitivity member, PL, PM, and PH, fuzzy sets for the number of cumulative recorded images, and TL, TM, and TH, fuzzy sets for the color correction execution interval. For example, when a sensitivity of a sensitivity member x belongs to both SL and SM fuzzy sets, if the number of cumulative recorded images y is members of both PL and PM fuzzy sets, the color correction execution interval belongs to a TH or TM fuzzy set.

Figure 12C:
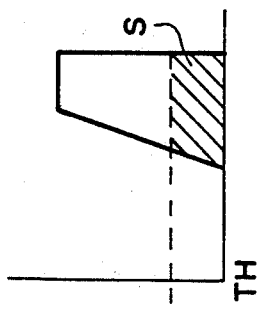
FIGS. 12A to 12G are graphs showing a procedure of calculating an optimal correction interval using fuzzy inference in an embodiment of the present invention.
Figure 12B:
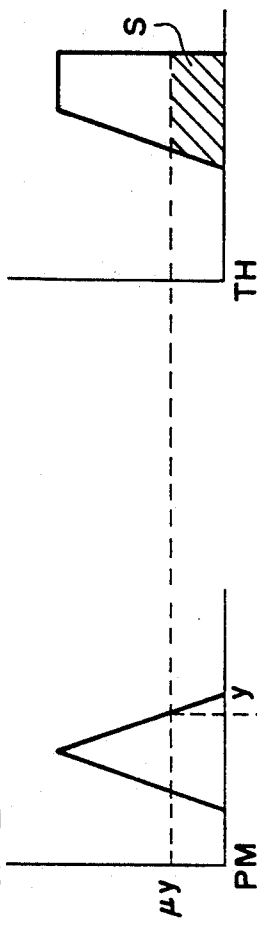
Figure 12A:
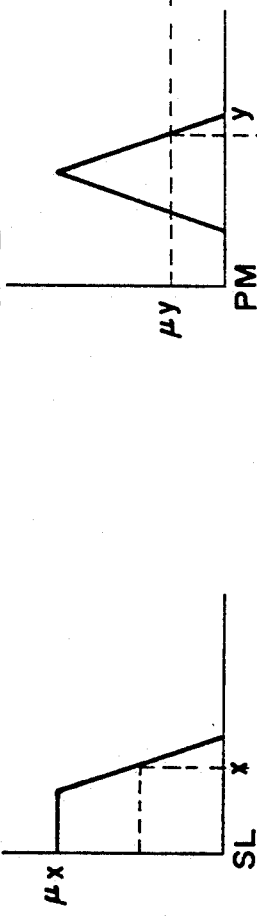
Figure 12F:
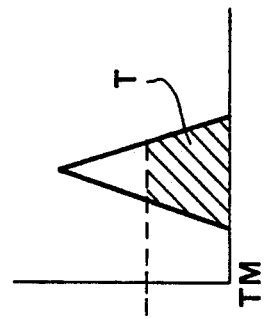
Figure 12E:
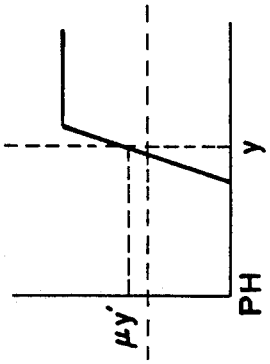
Figure 12D:
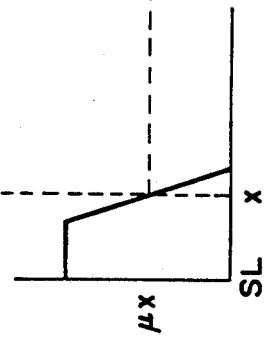
Figure 12G:
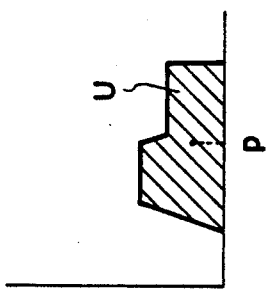

FIGS. 12A to 12G show examples of calculating an optimal color correction execution interval using fuzzy inference based on the Mumdani method under a rule 1 "SL and PM = TH" and a rule 2 "SL and PH = TM". Herein, assume that the quantities of state values SL and PM a state quantity detecting means has detected are x and y respectively. First, an optimal color correction execution interval is calculated under the rule 1. The membership of the input x concerning the sensitivity of a sensitivity member is determined using the membership functions shown in FIG. 10A. This reveals that the input x belongs to the SL set at a rate of $\mu x$ as shown in FIG. 12A. On the other hand, according to the membership functions for the number of cumulative recorded images, the input y belongs to the PM set at a rate of $\mu y$. After that, a minimum of the $\mu x$ and $\mu y$ values ($\mu y$ in this case) is determined as a degree for satisfying the subject of condition of the rule 1. Then, the minimum is assigned to the associated membership function for the color correction interval. This provides a set shown with a trapezoid S or a hatched area in FIG. 12C.

When the rule 2 is adopted, the foregoing calculation is also performed. This provides a set shown with a trapezoid T or a hatched area in FIG. 12F. After that, two sets shown with trapezoids S and T are summed up to calculate a maximum set or the two sets. This provides a new fuzzy set shown with a hatched area U in FIG. 12G. A value p or as a center of gravity representing this fuzzy set U is regarded as a color correction execution interval drawn out by fuzzy inference.

Second embodiment

In the first embodiment, the execution interval of color coefficient optimization is adopted as a quantity of control. This embodiment is not limited to the execution interval. For example, the number of sample colors for color correction may be employed as a quantity of control. Alternatively, the number of effective digits of a constant for color correction may be employed as a quantity of control. When an image forming apparatus includes a color developing unit that handles four or more colors, a color to be used for image formation may be adopted as a quantity of control. In this case, quantities of state values may be the sensitivity of a sensitivity member and the number of cumulative recorded images. Needless to say, other quantities of state values may be used.

In the first embodiment, the sensitivity of a sensitivity member and the number of cumulative recorded images are used as quantities of state values. The present invention is not limited to these quantities of state values. For example, the density of development agent and transfer performance may be employed as quantities of state values. Then, based on the quantities of state values, a quantity of control is determined using fuzzy rules. Thus, the conditions for image formation may be controlled.

As described previously, according to the first embodiment of the present invention, quantities of state values are detected to estimate the relation between an original image signal and a formed image color. Based on these quantities of state values, an optimal quantity of control for a color processing means is inferred using fuzzy rules. Thus, the color processing means is controlled according to the optimal quantity of control. Therefore, even a simple configuration permits high-precision control. Without time-consuming optimization, stable color reproducibility is ensured despite a time-sequential changes in the performance of a photosensitive drum or development agent.

Third embodiment

Figure 15:
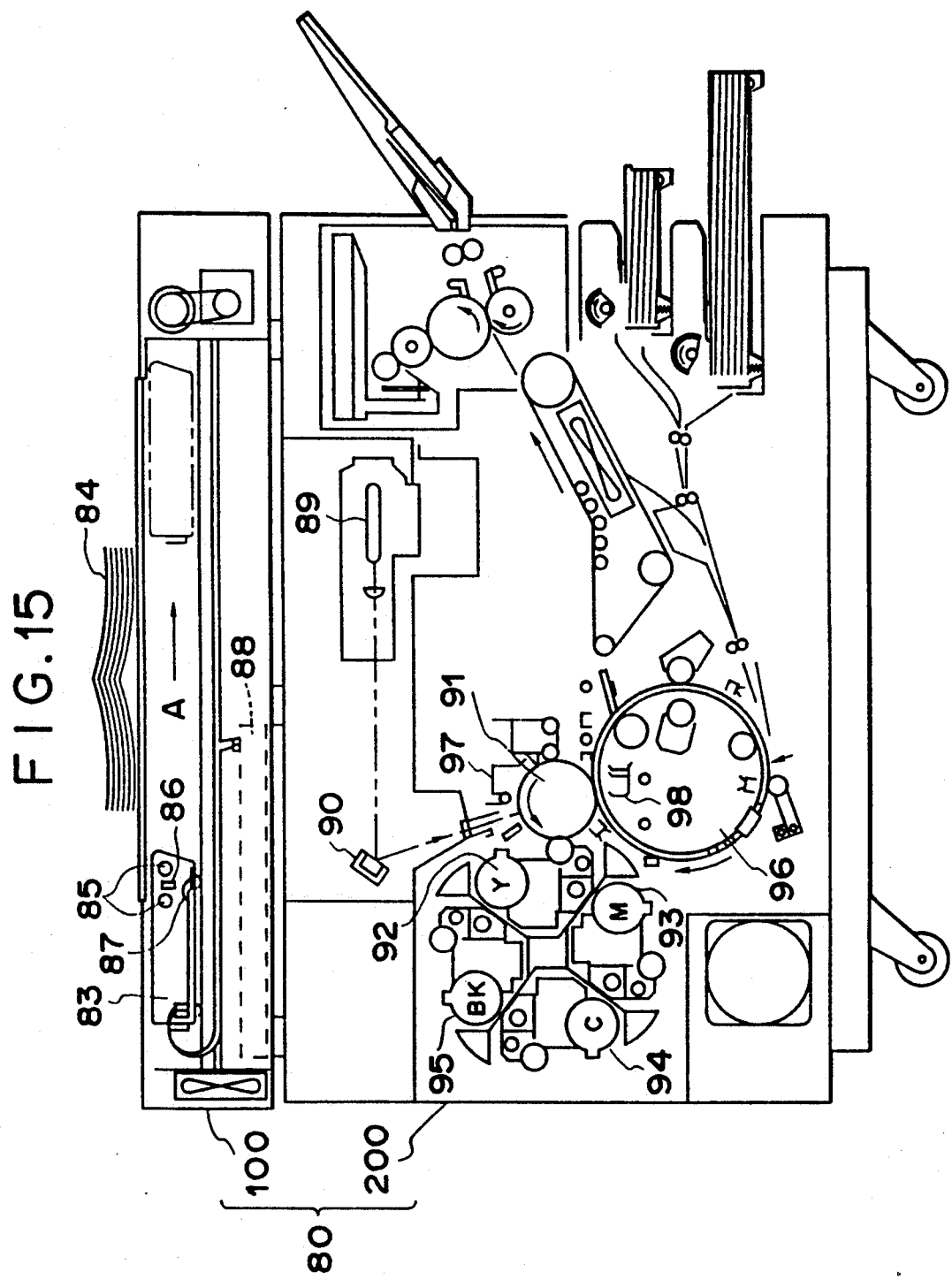
FIG. 15 is a cross-sectional diagram showing the third embodiment.

FIG. 15 is a cross-sectional diagram showing an example of a configuration of a color reader printer or an image forming apparatus to which the present invention applies. 100 denotes a reader, and 200, a printer.

First, an original 84 is illuminated by a light 85 of a reader scan unit 83. A lens array 86 forms the image of the original on a CCD array 87. The reader scan unit 83 scans the original 84 in an arrow-A direction to read the image data. The reader 100 sends signals including image data 111, a horizontal synchronizing signal 122, and a control signal 124 to be transferred between a reader CPU and a printer CPU.

The image data 111 sent from the reader 100 enters a gradation control circuit 121 of the printer 200. Since an image clock from the reader 100 differs in speed from that from the printer 200, the gradation control circuit 121 includes a function for synchronizing these image clocks and a function for associating image data with a color reproduction density of the printer 200. Output data of the gradation control circuit 121 is supplied to a laser driver 122 to drive a laser 123. Then, an image is reproduced.

A control 125 of the printer communicates with the reader 100 over a communication control line 124, and controls control elements of the printer 200. Reference numeral 126 denotes a potential sensor for detecting electric charges present over a photosensitive member 129. Reference numeral 127 is a potential measuring unit for converting an output of the potential sensor 126 into a digital signal and inputting the digital signal to the control 125. The potential data fed to the control 125 is read by a CPU 125-1 of the control 125, and used for control. On the other hand, a signal sent from a sensor 128 for detecting an image top signal ITOP is supplied to the control 125 and used for control. The outputs of a humidity sensor 98 and a temperature sensor 99, which are used to correct development characteristics, are supplied to the control 125 via an A/D converter 125-3. The humidity sensor 98 in this embodiment is characteristic of changing its output depending on temperature. A relative humidity αH that is represented as a ratio of a quantity of saturated vapor to a temperature is given as follows:

$$\Delta H = f(T,H)$$

where, T is a temperature, and H, an output value of the humidity sensor. Normally, the function f is provided as an expression of third order. The T and H values or the outputs of the temperature sensor 99 and humidity sensor 98 are converted into digital values by the A/D converter 125-3 of the control. Then, a relative humidity is calculated.

Then, control to be described later is performed according to the calculated relative humidity.

In FIG. 15, color image data sent from a reader 100 is subjected to PWM and other processing. Finally, a laser is driven. A laser beam modulated to cope with the image data scans at a high speed with the help of a quickly-rotating polygon mirror 89. Then, the laser beam reflected from a mirror 90 exposes the surface of a photosensitive drum 91 in image dots. A horizontal scan length of a laser beam corresponds to that of an image. In this embodiment, the length is 1/16 mm. On the other hand, the photosensitive drum 91 rotates at a constant speed in an arrow direction. A plane image is exposed continuously because the laser beam is scanning in the main scanning direction and the photosensitive drum 91 is constantly rotating in the sub scanning direction. The photosensitive drum 91 is charged uniformly by a charger 97, then exposed. When the charged photosensitive member is exposed to light, a latent image is produced. Then, the latent image produced with given color signals are developed by developing units 92 to 95 associated with the given colors.

Figure 16:
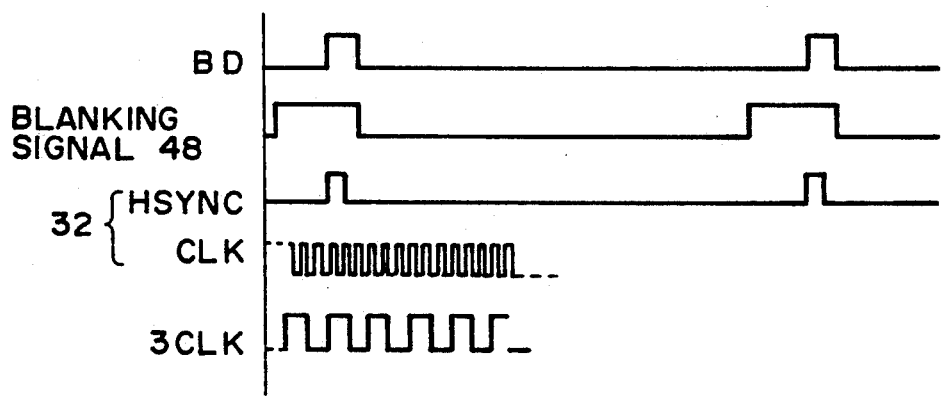
FIG. 16 shows the relations among signals in the gradation control circuit.

For example, the first original exposure scan performed in a color reader will be discussed. First, when a photosensitive drum 91 is exposed to light, a dot image is formed with yellow components of an original. Then, the dot image is developed by a yellow developing unit 92. Next, when the photosensitive drum 91 is brought into contact with a transfer drum 96 around which paper is wound, a transfer charger 98 transfers the yellow image onto the paper to produce a yellow toner image. The above process is repeated for magenta, cyan, and black. Then, the color images are superimposed on the paper to produce a color image containing four kinds of color toner. Description of a gradation control circuit (FIGS. 14 and 16)

Figure 14:
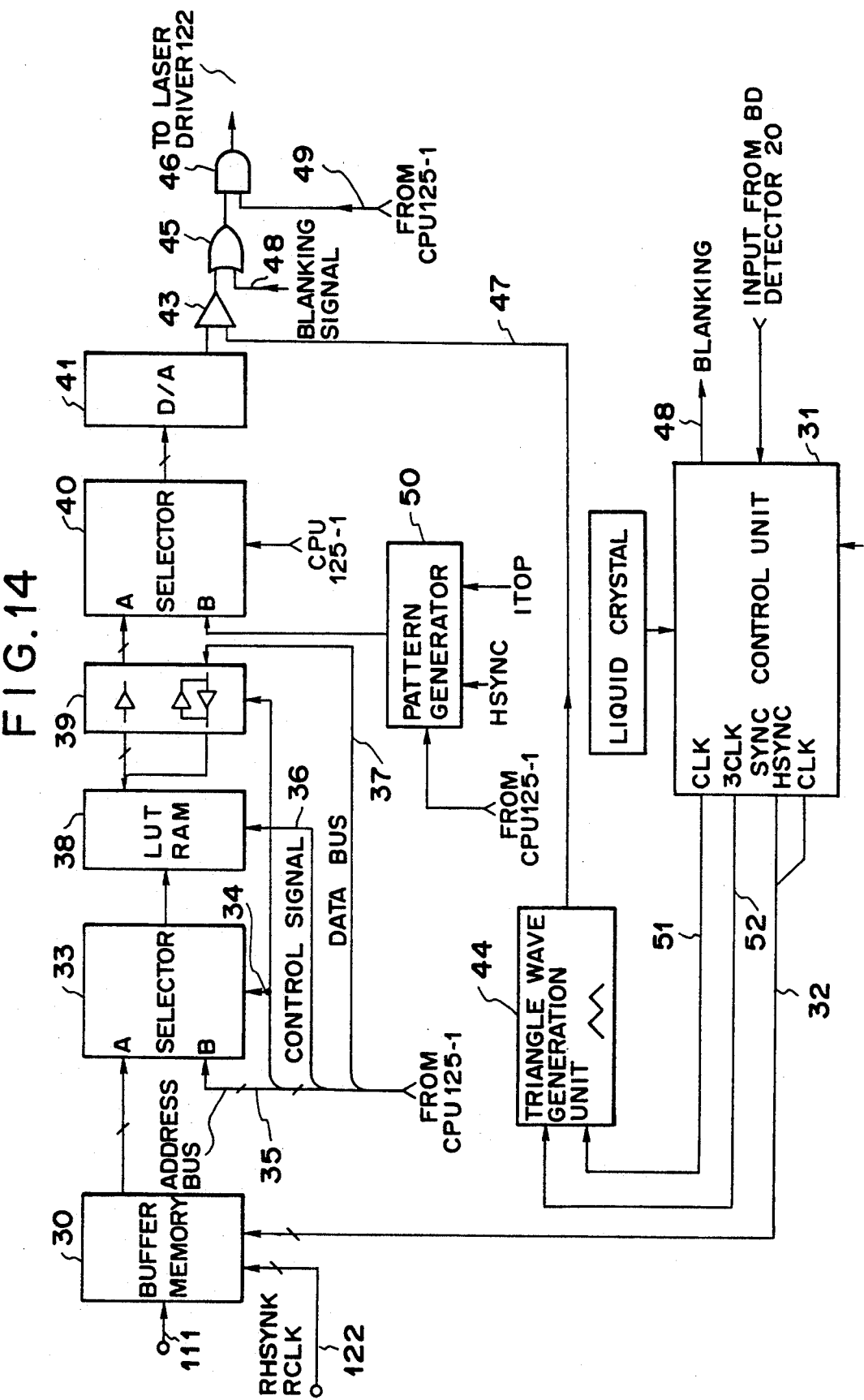
FIG. 14 is a block diagram of a gradation control circuit.

FIG. 14 is a block diagram showing a gradation control circuit 121.

Eight-bit image data 111 from a reader is put in a buffer memory 30 in synchronization with a synchronizing signal RHSYNC sent from a synchronizing signal processor of the reader and an image clock RCLK. Image data stored in the buffer memory 30 is read out in synchronization with a HSYNC signal sent from a synchronization control 31 and a CLK signal 32. This resolves a synchronous out or a difference in processing speed between a reader 100 and a printer 200. Then, a selector 33 is provided with the output.

When a select signal 34 sent from a CPU 125-1 of a control 125 selects an A input of the selector 33, image data is allocated to an address in an RAM (LUTRAM) 38 containing a look-up table. At this time, the CPU 125-1 reads the LUTRAM 38 in response to a control signal 36. The LUTRAM 38 outputs data in association with the input image data. The output data is supplied to a selector 39. Then, the data is further sent to the next selector 40 according to the select signal 34. When a select signal 42 specifies an A input of the selector 40, the data is supplied to a D/A converter 41, then converted into an analog signal.

An analog-converted image signal enters a comparator 43. Then, the analog image signal is compared with a triangle wave 47 generated by a triangle wave generator 44. The image signal that is PWM-modulated by the comparator 43 passes through an OR circuit 45 and an AND circuit 46, then enters a laser driver 122. Herein, a blanking signal 48 sent from a synchronization control 31 allows a BD detector to light a laser 123 and thus to detect BD. A signal 49 is an inhibit signal sent from the CPU 125-1 to disable the laser 123, which helps extend the service life of the laser 123.

Reference numeral 50 denotes a pattern generator. The pattern generator 50 outputs a given pattern for checking an image signal. The pattern generator 50 is provided with a transfer drum synchronizing signal ITOP, a horizontal synchronizing signal HSYNC from the printer 200, and a control signal from the CPU 125-1. When outputting a pattern signal, the CPU 125-1 changes the select signal 42 to specify a B input of the sector 40, outputs data from the pattern generator 50 to the D/A converter 41, then checks the image signal.

With an instruction from the CPU 125-1, a synchronization control 31 outputs either a CLK 51 or 3CLK 52 as a triangle wave generation clock to lock on a reference clock sent from a crystal oscillator. With input of a BD signal from a DB detector 120, the synchronization control 31 outputs a blanking signal 48, a horizontal synchronizing signal HSYNC sent from the printer 200, and an image clock CLK. Based on an input clock, a triangle wave generation unit 44 outputs a triangle wave 47 synchronous with a CLK 51 or a 3CLK 52.

FIG. 16 is a timing chart showing the waves of the foregoing BD signal, blanking signal 48, and other clocks.

A crystal oscillator provides a synchronization control 31 with a clock whose cycle is at least double the length of an image clock. Then, HSYNC, CLK, and other clock synchronous with the BD signal and the clock are supplied. A blanking signal 48 is generated by a counter that is reset at the trailing edge of the BD signal and counts time intervals shorter than the cycle of the BD signal.

Figure 17:
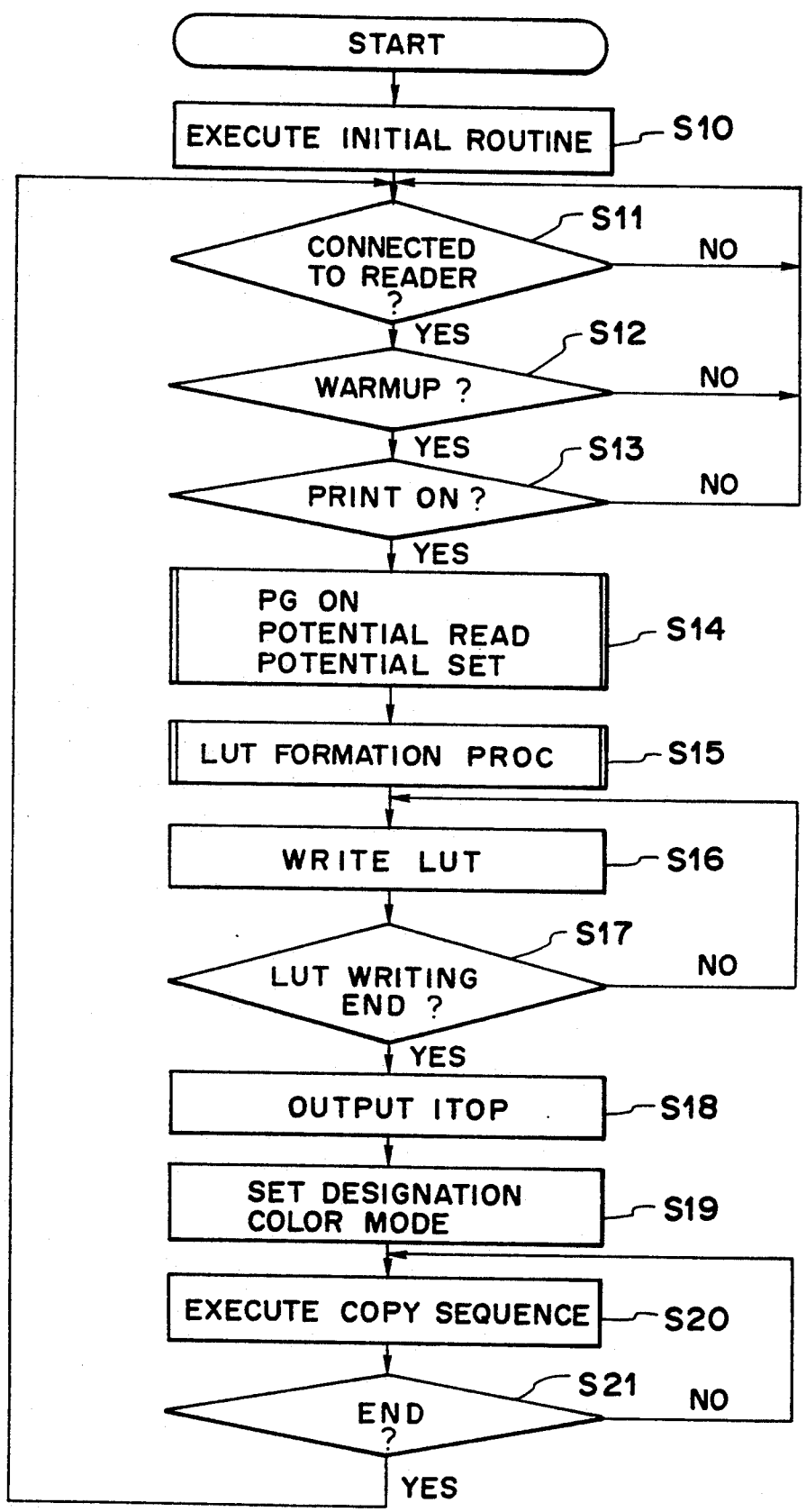
FIG. 17 is a flowchart showing the operations of a printer.

FIG. 17 is a flowchart of a processing program the control 125 of a printer 200 executes. The program is stored in a ROM 125-2.

When the power supply of a printer 200 is turned on, an initial routine is executed at a step S10. At this step, input and output terminals are checked, a RAM is initialized, potential is removed from the drums in the machine main unit, and other initialization is carried out. At a step S11, connection with a reader 100 is checked. If the connection is confirmed, control advances to a step S12. Then, it is checked if a fusing heater is warmed up to a given temperature (if warm-up is complete). When warm-up is complete, control advances to a step S13. It is checked if a print instruction is issued from the reader 100. When a print instruction is entered, PGON processing to be described later is executed at a step S14.

Based on the result of the step S14, data to be written in a LUTRAM 38 is calculated at a step S15, then written in the LUTRAM 38 at a step S16. More specifically, the B input of a selector 33 is selected using a select signal 34. A data bus 36 of a CPU 125-1 is connected to a data input of the LUTRAM 38 via a selector 39. Then, the CPU 125-1 transfers an address of the LUTRAM 38 to an address bus 35 and the data to be written to the data bus 37. Then, with a writing pulse of a control signal 36, the data is written in the LUTRAM 38.

At a step S17, it is checked if writing data in the LUTRAM 38 terminates. If it terminates, an ITOP signal is issued to the reader 100 at a step S18. At a step S19, a designation color mode is set. In the meantime, LUT is performed for each color by changing a selector. Next, printing operations are carried out at steps S20 and S21 to produce a monochrome image. When the color mode terminates, control returns to the step S11.

Figure 13:
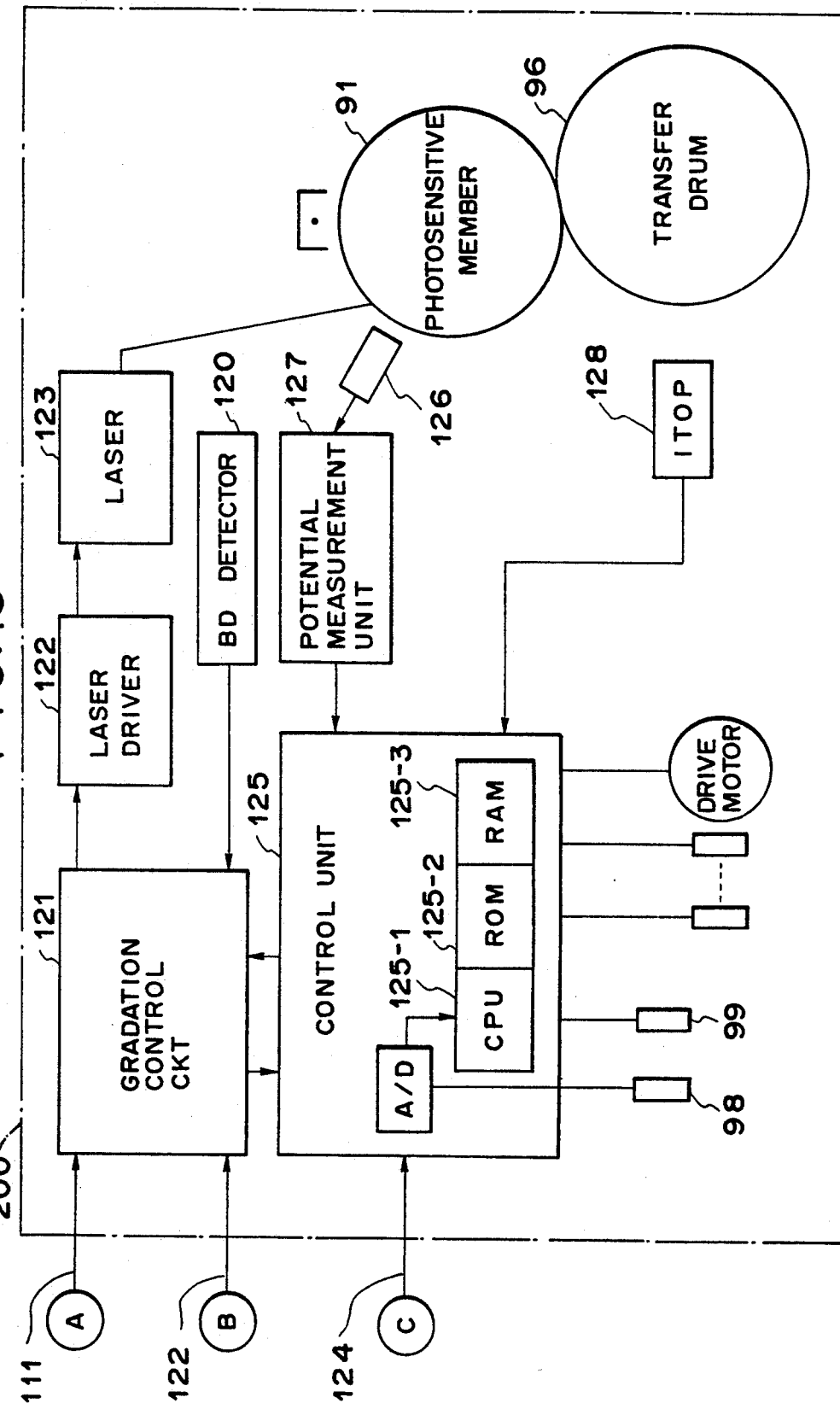
FIG. 13 is a block diagram of electric circuits in a main section of an image forming apparatus according to the third embodiment of the present invention.
Figure 18:
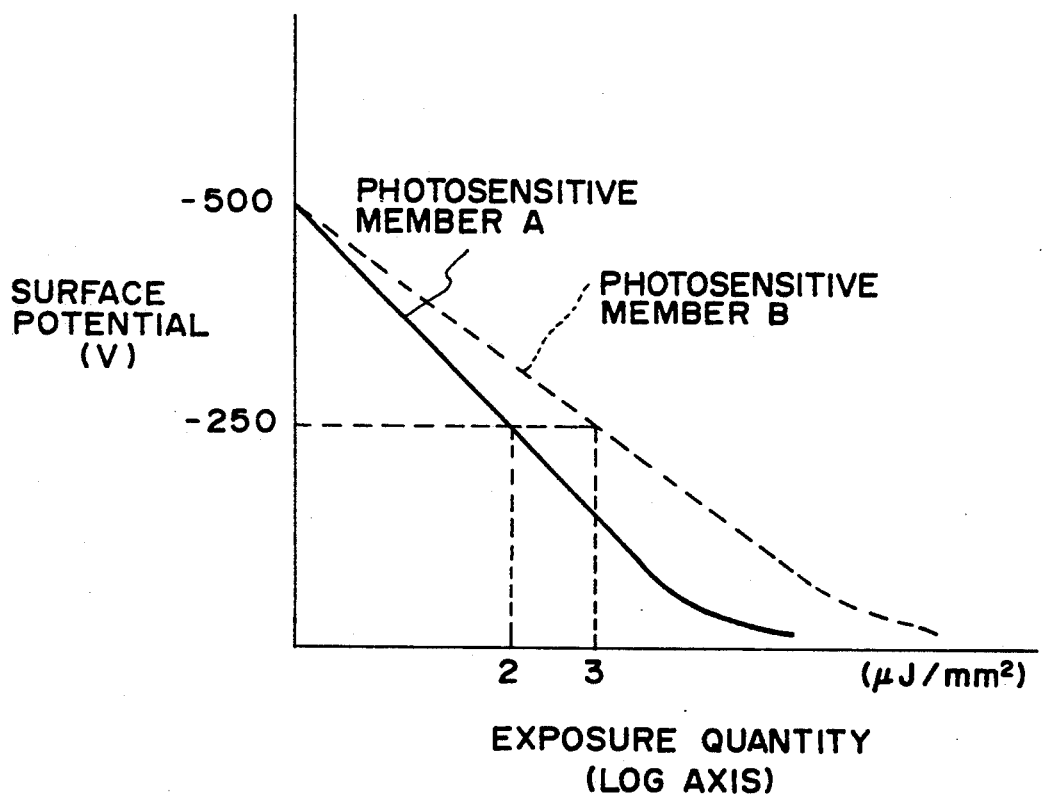
FIG. 18 shows the relation between the surface potential of a photosensitive member and a quantity of exposure.
Figure 19:
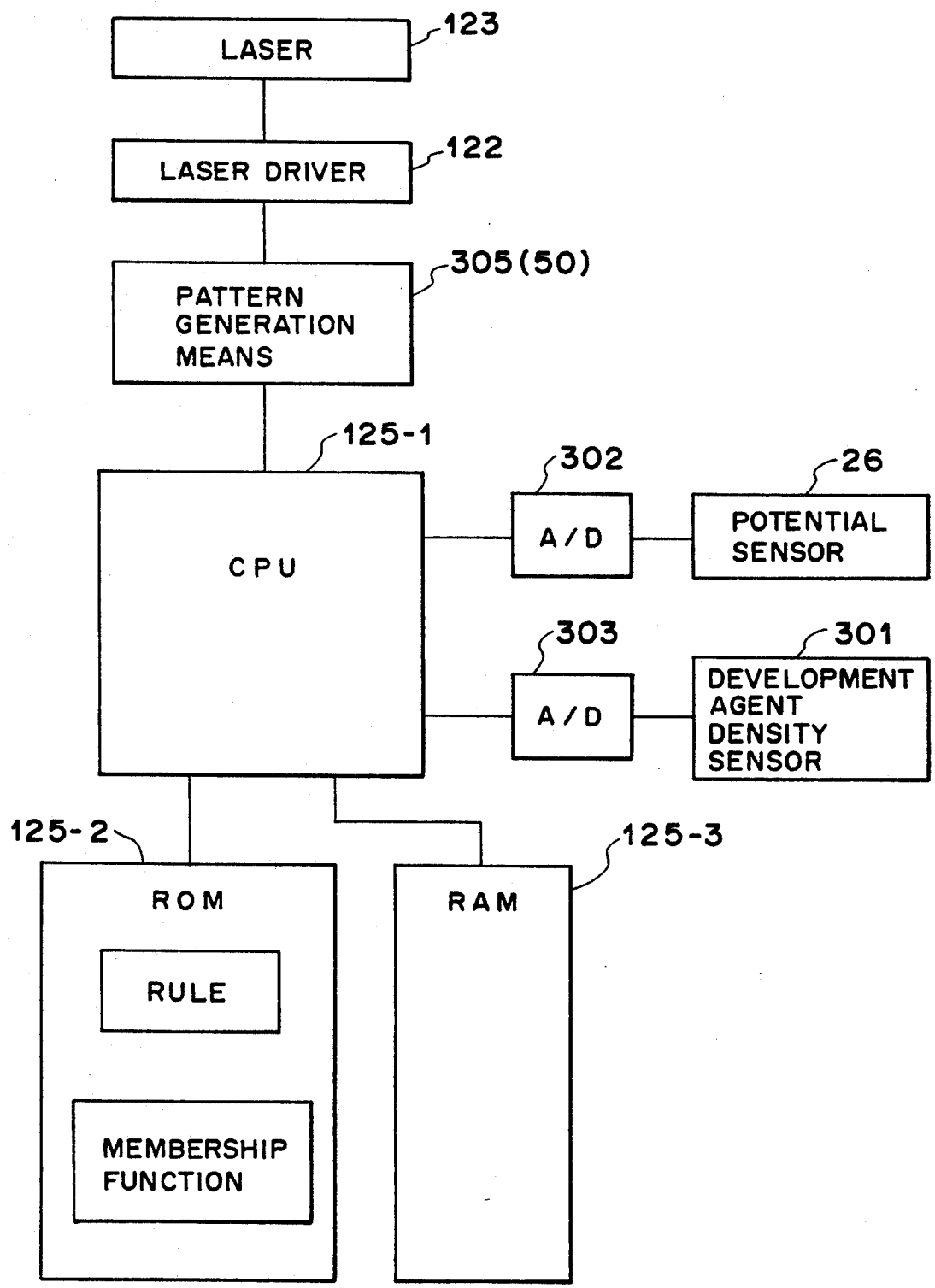
FIG. 19 is a block diagram of a gradation correction means.

When the sensitivity of a photosensitive member, number of cumulative recorded images, or density of development agent varies, the gradation of an output image changes. In this embodiment, a gradation correction means disclosed in Japanese Patent Appln. Laid-Open No. 63-208368 is incorporated to correct gradation at given intervals. FIG. 19 shows the configuration of the gradation correction means. Components identical to those in FIG. 13 are assigned the same numerals. Quantities of state values for this control operation are the sensitivity of a photosensitive member as shown in FIG. 18 that is detected by a potential sensor 126 shown in FIG. 13 (defined with a quantity of light required to halve the surface potential of a dark area) and the density of development agent detected by a development agent density sensor 301 arranged in a developing unit. These quantities of state values are converted into digital data by A/D converters 302 and 303, then put in a CPU 304. The operation interval of the gradation correction means is employed as a quantity of control.

Figure 20A:
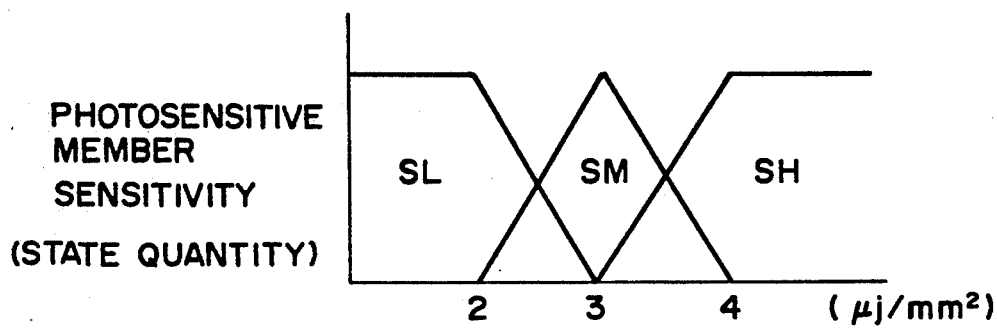
FIGS. 20A to 20C are graphs showing membership functions.
Figure 20B:
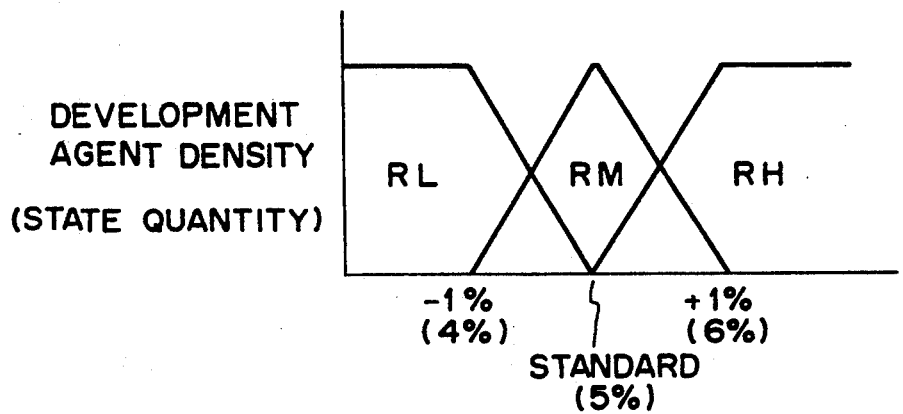
Figure 20C:
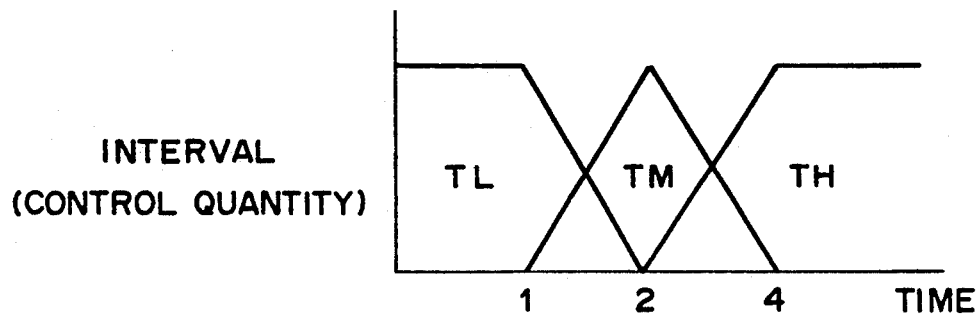

FIGS. 20A to 20C show membership functions for defining fuzzy sets concerning each of quantities of state values and of control. Three membership functions are predetermined for each of the quantities of state values and of control, which are stored in a ROM 307 (FIG. 19). That is to say, each of the sensitivity of a photosensitive member, density of development agent, and interval is classified into three fuzzy sets according to the three membership functions.

Next, the fuzzy sets concerning quantities of state values or a sensitivity of a photosensitive member and a density of development agent, and the fuzzy sets of an interval or a quantity of control are used to explain how to calculate an optimal interval according to the sensitivity of a photosensitive member and density of development agent.

Fuzzy rules below, for example, are employed to determine an interval.

(Rule 1) If a sensitivity of a photosensitive member = SL and a density of development agent = RL, then an inverval = TL.

(Rule 2) If a sensitivity of a photosensitive member = SM and a density of development agent = RL, then an interval = TM.

These fuzzy rules are specified if necessary.

FIG. 23A shows the aforesaid fuzzy rules. The fuzzy rules are stored in a ROM 125-2.

In FIG. 23A, SL, SM, and SH denote fuzzy sets for the sensitivity of a photosensitive member, RL, RM, and RH, fuzzy sets for the density of development agent, and TL, TM, and TH, fuzzy sets for the correction interval.

FIGS. 21A to 21G show examples of calculating a correction interval using fuzzy inference under the rule 1 and rule 2.

Assume that a sensitivity of a photosensitive member is x and a density of development agent is y. First, a correction interval is to be calculated under the rule 1. The membership of the input x concerning the sensitivity of a photosensitive member is determined using the membership functions shown in FIG. 20A. This reveals that the input x belongs to an SL set at a degree of $\mu x$. On the other hand, according to the membership functions for the density of development agent shown in FIG. 20B, the input y is determined to belong to an RL set at a degree of $\mu y$ as shown in FIG. 21B.

Then, a minimum of the $\mu x$ and $\mu y$ values is regarded as a degree of satisfying the subject of condition of the rule 1. The minimum value is assigned to the associated membership function for the correction interval shown in FIG. 20C, thus calculating a set shown with a trapezoid S or a hatched area in FIG. 21C. To short, a figure TL or a graph for the correction interval in FIG. 20C is partitioned with a line extending from a point representing the minimum value. This provides the trapezoid S.

Under the rule 2, the foregoing calculation is also performed. This provides a trapezoid T or a hatched area in FIG. 20F. Then, two sets shown with trapezoids S and T are summed up (to calculate a maximum set of the two sets) to provide a sum U or a hatched area shown in FIG. 21G. Then, the sum U is divided with a center line so that the right and left areas will be equal. The value on the center line is regarded as a set value of a correction interval drawn out by fuzzy inference.

Herein, rules 1 and 2 only are employed as fuzzy rules. When a correction interval is calculated in reality, all the nine fuzzy rules shown in FIG. 23A are used to determine an interred value.

Fourth embodiment

Figure 22A:
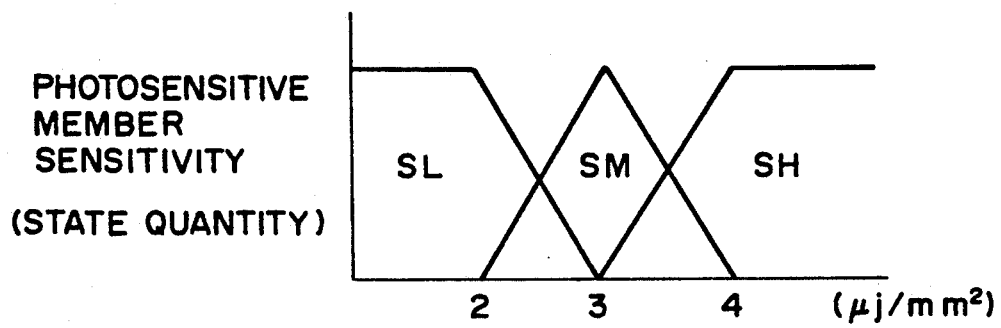
FIGS. 22A to 22C are graphs showing membership functions.
Figure 22B:
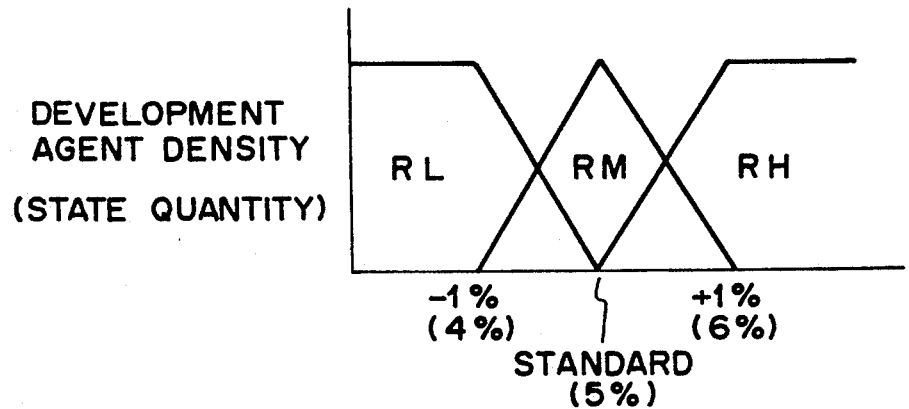
Figure 22C:
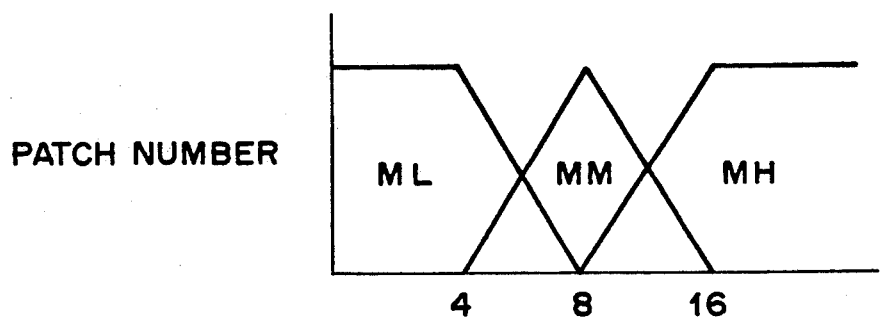

In the aforesaid embodiment, a correction interval of a correcting means is employed as a quantity of control. The present invention is not limited to this quantity of control. An alternative quantity of control may be the number of patches to be measured in a test pattern displayed when the correcting means is in operation. Even in this case, a sensitivity of a photosensitive member and a density of development agent are used as quantities of state values. Needless to say, other quantities of state values may be employed. FIGS. 22A to 22C show fuzzy sets represented as membership functions for these quantities of state values and control. Three sets are predetermined for each of the quantities of state values and control in the same manner as in the first embodiment. FIG. 23B shows the fuzzy rules for this embodiment. The procedure of fuzzy inference is identical to that in the aforesaid first embodiment. The description will, therefore, be omitted. In FIG. 23B, ML, MM, and MH denotes fuzzy sets for the number of patches to be measured.

Fifth embodiment

In the aforesaid third embodiment, a sensitivity of a photo and a density of development agent are employed as quantities of state values. The present invention is not limited to these quantities of state values. For example, a temperature and a humidity detected by a temperature/humidity sensor arranged in the vicinity of a developing unit, the number of cumulative recorded images, and a detected output of a transfer efficiency measuring means may be used as quantities of state values. According to these quantities of state values, a quantity of control may be determined using fuzzy rules. With the quantity of control, a gradation correction means may be controlled.

As described previously, according to the embodiments of the present invention, even a simple configuration permits high precision and fine gradation correction. This reduces a time loss due to gradation correction, minimizes consumption of development agent, and thus ensures constant gradation all the time.

The present invention is not limited to the aforesaid embodiments. A variety of modifications and applications will be realized based on the appended claims.

Combinations of the aforesaid embodiments are included in the spirit and scope of the present invention.

What is claimed is:

1. An image forming apparatus, comprising:
    an image forming means for forming an image on a medium;
    reading means for reading the image formed on the medium by said image forming means and generating an electrical signal;
    correction means for correcting the condition of said image forming means based on the electrical signal generated by said reading means;
    detecting means for detecting a plurality of parameters indicating a condition of said image forming means;
    rule storage means for storing rules for determining a relation between the parameters detected by said detecting means and an operation timing of said correction means; and
    control means for controlling the operation timing of said correction means in accordance with the parameters detected by said detecting means and the rules stored in said rule storage means.

2. An image forming apparatus according to claim 1 wherein said image forming means has a plurality of parts for forming a plurality of color component images.

3. An image forming apparatus according to claim 1 wherein said detecting means detects at least one of a temperature, a humidity, and the number of cumlative recorded images as a parameter.

4. An image forming apparatus according to claim 3 wherein said image forming means forms images using electrophotography, and said detecting means detects at least one of a sensitivity of a photosensitive member, a density of development agent, and a transfer efficiency as a parameter.

5. An image forming apparatus according to claim 1 wherein said correction means optimizes an image forming condition of said image forming means.

6. An image forming apparatus according to claim 1 wherein said rule storage means comprises a ROM.

7. An image forming apparatus according to claim 1 wherein said control means calculates the timing of operation of said correction means using fuzzy inference under the rules stored in said rule storage means.

8. An image forming apparatus according to claim 1 wherein said apparatus is a copying apparatus.

9. An image forming method, comprising the steps of:
    detecting a plurality of parameters indicating a condition of an image forming apparatus;
    calculating the timing of correcting the condition of the image forming apparatus in accordance with the parameters detected at said detecting step and rules for determining the relation between the parameters and the timing by performing fuzzy inference;
    forming an image on a medium according to the timing calculated at said calculating step;
    reading the image formed on the medium and generating an electrical signal;
    correcting the condition of the image forming apparatus based on the electrical signal; and
    forming an image using the image forming apparatus whose condition is corrected at said correcting step.

10. A color image forming apparatus, comprising:
    image forming means for forming a color image on a medium;
    reading means for reading the color image formed on the medium by said image forming means and generating an electrical signal;
    correction means for correcting the condition of said image forming apparatus based on the electrical signal generated by said reading means;
    a detecting means for detecting a plurality of parameters indicating a condition of an image forming apparatus;
    rule storage means for storing rules for determining a relation between the parameters and an operation timing of said correction means; and
    control means for controlling the operation timing of said correction means in accordance with the parameters detected by said detecting means and the rules stored in said rule storage means.

11. An image forming apparatus according to claim 10 wherein said rule storage means is formed with a ROM.

12. An image forming apparatus according to claim 10 wherein said control means calculates the timing of operation of said correction means using fuzzy inference under the rules stored in said rule storage means.

13. An image forming apparatus according to claim 10 wherein said apparatus is a copying apparatus.

14. A color image forming method, comprising the steps of:

detecting a plurality of parameters indicating a condition of an image forming apparatus;

calculating a timing of correcting the condition of the image forming apparatus in accordance with the parameters detected at said detecting step and rules for determining the relation between the parameters and the timing by performing fuzzy inference;

forming a color image on a medium according to the timing calculated at said calculating step;

reading the color image formed on the medium and generating an electrical signal;

correcting the condition of the image forming apparatus based on the electrical signal; and forming a color image using the image forming apparatus whose condition is corrected at said correcting step.

* * * * *

UNITED STATES PATENT AND TRADEMARK OFFICE
CERTIFICATE OF CORRECTION

PATENT NO. : 5,262,833
DATED : November 16, 1993
INVENTOR(S) : Hisashi Fukushima, et al.

It is certified that error appears in the above-indentified patent and that said Letters Patent is hereby corrected as shown below:

ON THE COVER:

In the Figure

"ORIGNAL" should read --ORIGINAL--.

IN THE DRAWINGS:

Sheet 2, Figure 5

"ORIGNAL" should read --ORIGINAL--.

Sheet 10, Figure 14

"RHSYNK" should read --RHSYNC--.

COLUMN 1:

Line 7, "apparatus; such as," should read --apparatus such as--.
Line 49, "C" should be deleted.

UNITED STATES PATENT AND TRADEMARK OFFICE
CERTIFICATE OF CORRECTION

PATENT NO. : 5,262,833

DATED : November 16, 1993

INVENTOR(S) : Hisashi Fukushima, et al.

It is certified that error appears in the above-indentified patent and that said Letters Patent is hereby corrected as shown below:

COLUMN 4:

Line 24, "K" should read --Bk--.
Line 32, "in which" should read --containing--.

COLUMN 8:

Line 11, "or as" should read --, as--.
Line 12, "U" should read --U,--.

COLUMN 9:

Line 28, "aH" should read --$\Delta$H--.
Line 55, "sub scanning" should read --sub-scanning--.

COLUMN 10:

Line 17, "synchronous out" should read --out-of-sequence--.
Line 22, "an RAM" should read --a RAM--.
Line 58, "DB" should read --BD--.

UNITED STATES PATENT AND TRADEMARK OFFICE
CERTIFICATE OF CORRECTION

PATENT NO. : 5,262,833
DATED : November 16, 1993
INVENTOR(S) : Hisashi Fukushima, et al.

It is certified that error appears in the above-indentified patent and that said Letters Patent is hereby corrected as shown below:

COLUMN 12:

Line 46, "To short, a" should read --A--.
Line 62, "interred" should read --inferred--.

COLUMN 13:

Line 20, "photo" should read --photosensitive member--.

Signed and Sealed this

Ninth Day of August, 1994

BRUCE LEHMAN

Attest:

Attesting Officer

Commissioner of Patents and Trademarks